United States Patent
Fisher et al.

(10) Patent No.: US 11,438,733 B2
(45) Date of Patent: Sep. 6, 2022

(54) DETERMINING LOCATION BASED ON NEARBY DEVICES

(71) Applicant: Intuit Inc., Mountain View, CA (US)

(72) Inventors: Andrew Fisher, Eagle, ID (US); Brik Royster, Eagle, ID (US); Devin Shively, Eagle, ID (US); Jared Isaac Guttromson, Eagle, ID (US); Joshua Harrison, Eagle, ID (US); Josue David Tello, Eagle, ID (US)

(73) Assignee: Intuit Inc., Mountain View, CA (US)

( * ) Notice: Subject to any disclaimer, the term of this patent is extended or adjusted under 35 U.S.C. 154(b) by 163 days.

(21) Appl. No.: 16/862,038

(22) Filed: Apr. 29, 2020

(65) Prior Publication Data

US 2021/0345065 A1    Nov. 4, 2021

(51) Int. Cl.
*H04W 4/029*    (2018.01)
*H04W 4/02*    (2018.01)
*H04W 4/80*    (2018.01)

(52) U.S. Cl.
CPC .......... *H04W 4/029* (2018.02); *H04W 4/026* (2013.01); *H04W 4/80* (2018.02)

(58) Field of Classification Search
CPC ........ H04W 4/02; H04W 4/06; H04W 4/029; H04W 4/80; H04W 48/10; H04W 4/023; H04W 48/16; H04W 4/70; H04W 36/0061; H04W 72/048; H04W 74/006; H04W 84/18; H04W 8/005; H04W 12/10; H04W 40/246; H04W 4/027; H04W 64/00; H04W 64/003; H04W 72/121; H04W 88/02; H04W 8/22; H04W 8/24
See application file for complete search history.

(56) References Cited

U.S. PATENT DOCUMENTS

| | | | | |
|---|---|---|---|---|
| 2010/0279713 | A1* | 11/2010 | Dicke | H04M 1/72457 455/457 |
| 2014/0162687 | A1* | 6/2014 | Edge | H04H 20/08 455/456.1 |
| 2017/0337394 | A1* | 11/2017 | Wang | H04W 4/02 |
| 2019/0116465 | A1* | 4/2019 | Kulikov | G01S 19/48 |

OTHER PUBLICATIONS

Townsend, K., "GATT", https://learn.adafruit.com/introduction-to-bluetooth-low-energy/gatt, Mar. 20, 2014, 13 pages.

* cited by examiner

*Primary Examiner* — Kwasi Karikari
(74) *Attorney, Agent, or Firm* — Ferguson Braswell Fraser Kubasta PC

(57) ABSTRACT

A method for determining location based on nearby devices includes receiving a broadcast message from a proximate device over a wireless personal area network, triggering an event that requires recording location data and time data, and establishing a connection over the wireless personal area network to the proximate device. The method further includes requesting proximate location data from the proximate device over the connection with a user device location request and receiving the proximate location data from the proximate device in a proximate device location response.

18 Claims, 13 Drawing Sheets

User Interface 420

DETERMINING LOCATION BASED ON NEARBY DEVICES

BACKGROUND

Computing devices may generate location data and messages based on events. For example, "clock in" and "clock out" messages may be generated for events to identify when a user of a device is working on a project along with the location of the user. A challenge is to transmit and store the data from these messages at a server, even when the computing device does not have accurate location data or a connection to the server.

SUMMARY

In general, in one or more aspects, the disclosure relates to a method of a user device. The method includes receiving a broadcast message from a proximate device over a wireless personal area network, triggering an event that requires recording location data and time data, and establishing a connection over the wireless personal area network to the proximate device. The method further includes requesting proximate location data from the proximate device over the connection with a user device location request and receiving the proximate location data from the proximate device in a proximate device location response.

In general, in one or more aspects, the disclosure relates to a method that includes receiving a user device event message with proximate location data in a user device messaging format, wherein the proximate location data was received by the user device from a proximate device over a wireless personal area network and, after receiving a user updates request from a set of overwatch devices, automatically generating a set of server location update messages based on the proximate location data. The method further includes transmitting the set of server location update messages to the set of overwatch devices.

In general, in one or more aspects, the disclosure relates to a system that includes a processor and a memory. An application executes on the processor, uses the memory, and is configured for receiving a user device event message with proximate location data in a user device messaging format, wherein the proximate location data was received by the user device from a proximate device over a wireless personal area network and, after receiving a user updates request from a set of overwatch devices. The application is further configured for automatically generating a set of server location update messages based on the proximate location data and transmitting the set of server location update messages to the set of overwatch devices.

Other aspects of the invention will be apparent from the following description and the appended claims.

DETAILED DESCRIPTION

Figure 1:
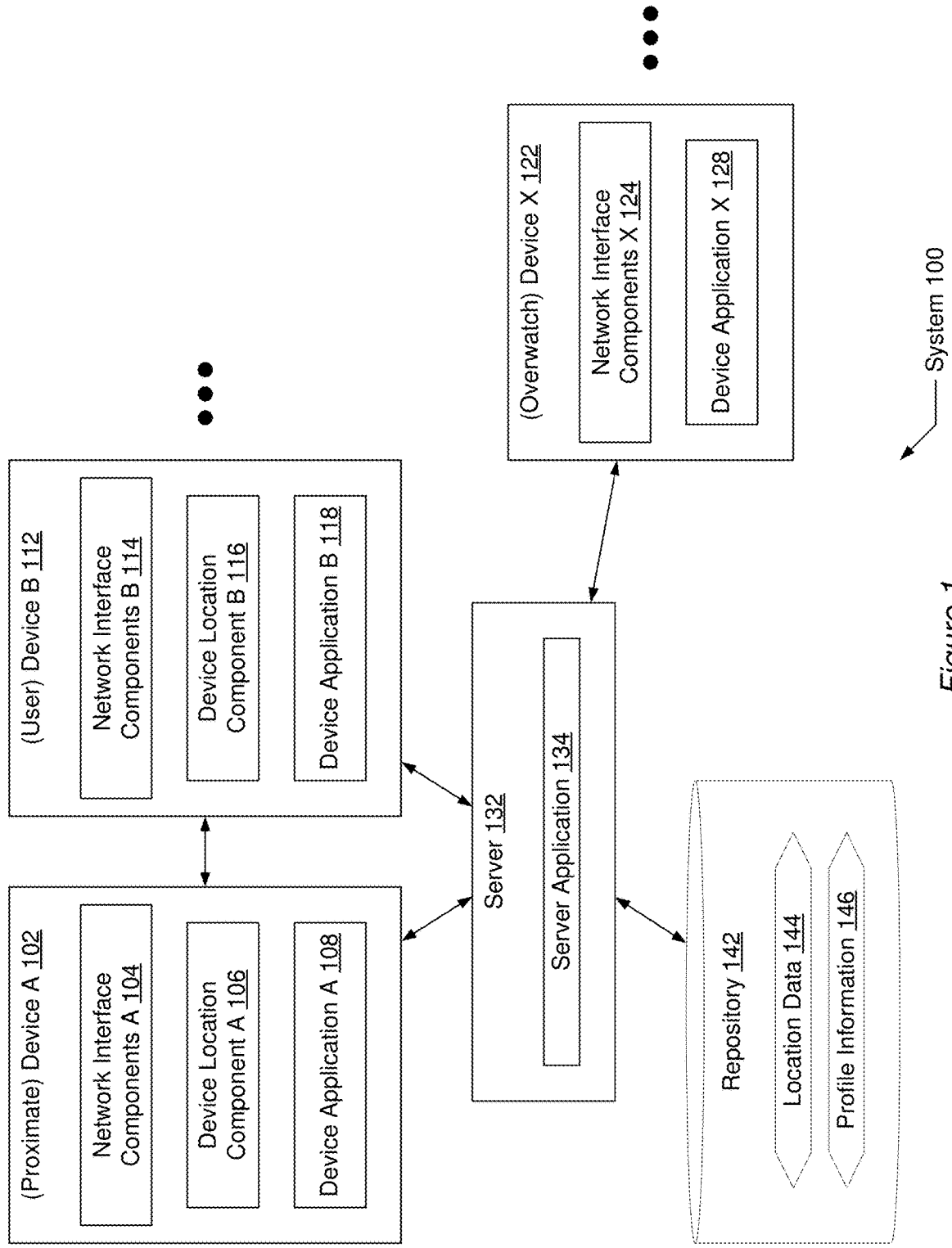
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements. Time data and date values in the disclosure may include values for day of month, day of week, week of year, month, year, hour, minute, second, microsecond, etc.

In general, embodiments of the disclosure gather location data and transmit messages with the location data to a server even when a computing device cannot generate accurate location data or connect directly to the server. A user device (e.g., a smartphone, personal digital assistant, portable computing device, etc.) determines whether it can generate accurate location data and can connect to the server. When the user device cannot generate accurate location data or connect to the server, the user device identifies other nearby devices (referred to as proximate devices) within range of a wireless personal area network. The user device then gathers location data from a proximate device. The user device may then transmit messages to the server using the proximate device.

FIG. 1 shows a diagram of embodiments that are in accordance with the disclosure. FIG. 1 shows multiple devices with multiple network connections that share location data. The embodiments of FIG. 1 may be combined and may include or be included within the features and embodiments described in the other figures of the application. The features and elements of FIG. 1 are, individually and as a combination, improvements to the technology of communication systems. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

The system (100) includes the device A (102), the device B (112), the server (132), the device X (122), and the repository (142). The system (100) shares location data and network connections so that, as an example, the location of the device B (112) may be stored to the repository (142) and displayed by the device X (122) when the device B (112) is unable to generate suitable location data and does not have a network connection to the server (132).

Figure 5A:
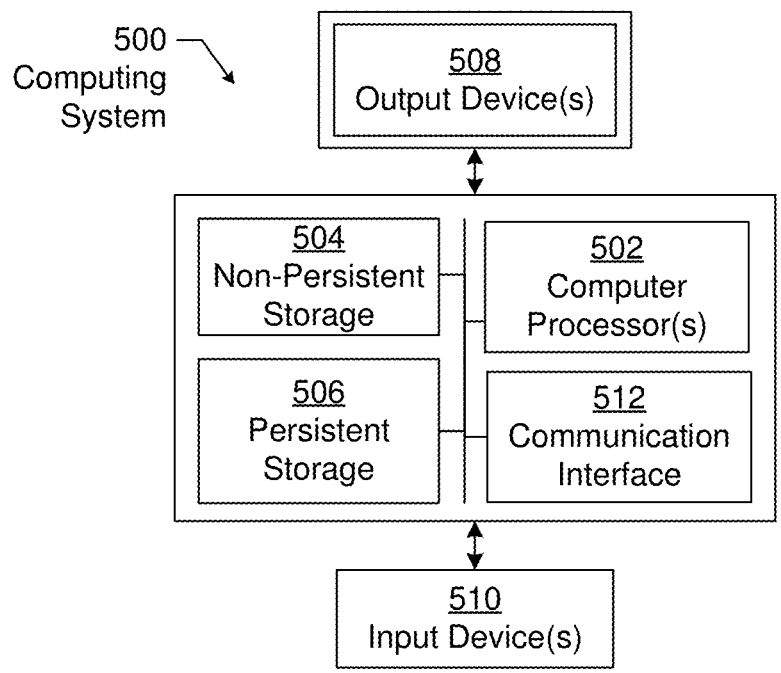
FIG. 5A and FIG. 5B show computing systems in accordance with disclosed embodiments.
Figure 5B:
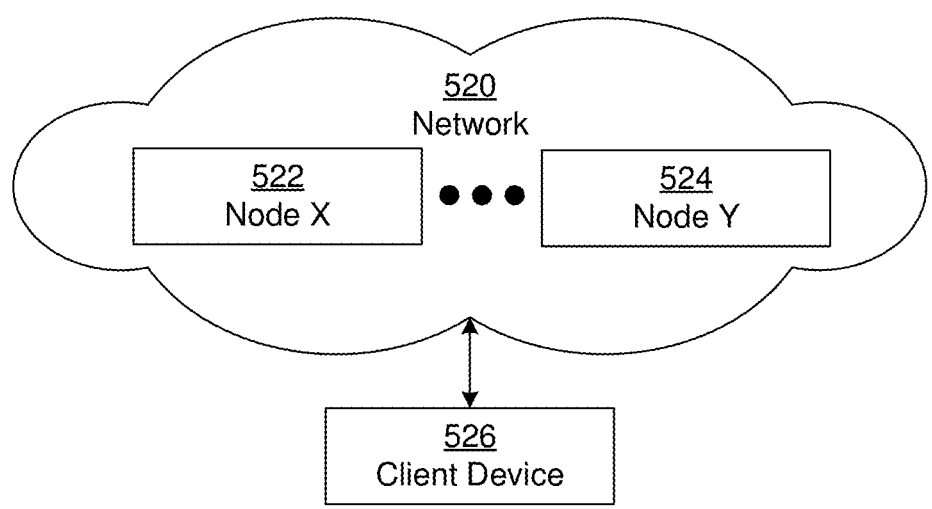

The device A (102) and the device B (112) are embodiments of the computing system (500) described in FIG. 5A and the client device (526) described in FIG. 5B and may take the form of smartphones, tablet computers, personal computers, etc. that are modified in accordance with the disclosure. The device A (102) and the device B (112) share location data and network connections over a wireless personal area network with each other and with other devices in range of the wireless personal area network.

The device A (102), the device B (112), and the device X (122) may each perform the operations of a user device, a proximate device, a parent device, a child device, and an overwatch device.

A user device (e.g., the device B (112)) is a computing system that generates events and transmits messages to the server (132). For example, a user device may generate a "clock in" event to indicate that the user of the user device is at a particular place working on a particular job. The event messages generated by the user device include location data that identifies the location of the user device and are transmitted to the server (132). When the location data generated by the user device is unsuitable (e.g., is unavailable or does not meet a threshold level of accuracy), the user device may request proximate location data from proximate devices that are proximate to the user device, i.e., within the range of the wireless personal area network transmissions of the user device.

A proximate device (e.g., the device A (102)) is a computing system that is proximate to a user device. A proximate device may receive requests for location data from user devices, transmit proximate location data to user devices, and pass messages and notifications between user devices and the server (132).

A parent device (e.g., the device A (102)) is a computing system that has been identified as a parent device by a child device. Multiple child devices may identify a single device as a parent device. The parent device may manage location information and network connections with its child devices and with its parent device, as described further below.

A child device (e.g., the device B (112)) is a computing system that may receive location information from a parent device of the child device. A child device may also be a parent device.

An overwatch device (e.g., the device X (122)) is a computing system that displays information from the server (132) provided by other devices. For example, an overwatch device may display event information, location information, and profile information transmitted to the server (132) from the device A (102) and the device B (112).

The device A (102) includes the network interface components A (104), the device location component A (106), and the device application A (108). The network interface components B (114), the device location component B (116), and the device application B (118) of the device B (112) may be similar to those of the device A (102).

The network interface components A (104) includes hardware and software components that connect and interface with wired or wireless networks, including mobile networks (e.g., 4G or 5G networks), wireless local area networks (WLANs) (e.g., Wi-Fi networks), local area networks (LANs), wireless personal area networks (e.g., Bluetooth low energy (BLE) networks, and near field communication (NFC) networks). As an example, the device A (102) may connect to the server (132) using a mobile network (a 4G or 5G network protocol) and connect to the device B (112) using a wireless personal area network (a Bluetooth low energy network protocol).

The device location component A (106) includes hardware and software components that identify a location of the device A (102). The device location component A (106) may include satellite-based radio navigation components (e.g., a global positioning system (GPS) receiver), accelerometers, magnetometers, gyroscopes, etc., from which the location of the device A (102) is determined. The location of the device A (102) may be identified with values that indicate the longitude, latitude, and altitude of the device A (102).

The device application A (108) includes software components, modules, and programs that share information (e.g., location data, event messages, notifications, etc.) with other devices. The device application A (108) may be a web application running in a browser of the device A (102) and may be a native application running on the operating system of the device A (102). The device application A (108) performs user device functions, proximate device functions, parent device functions, child device functions, and overwatch functions. The functions include computing system operations of receiving information, data, messages, and notifications from other devices; converting data from other devices to formats used by the device A (102); storing data to the device A (102); generating messages and notifications for other devices using multiple protocols; and transmitting messages and notifications to other devices; and presenting information with a user interface.

The device X (122) may be similar to the device A (102). The device X (122) may perform overwatch operations without performing the other functions, operate without a wireless network connection, and operate without a device location component. For example, the device X (122) may be personal computer that displays the locations of the device A (102) and the device B (112) on a user interface without generating and transmitting location data based on events triggered by the device X (122).

The server (132) includes hardware and software components that interface and interact with the device A (102), the device B (112), the device X (122), and the repository (142). As an example, the server (132) may receive, from the device A (102), an event message, generated by the device B (112) with proximate location data identifying the location of the device B (112) when the device B (112) does not have a mobile connection to the server (132) and does not generate suitable location data. The server (132) may be one of a set of virtual machines hosted by a cloud services provider to deploy the server application (134).

The server application (134) includes software components, programs, and interfaces to perform the operations of the server (132). The server application (134) may be a website and expose a representational state transfer (RESTful) application programming interface (API) used by the devices of the system (100) to store event information and location data on the repository (142).

The repository (142) is a computing system that may include multiple computing devices in accordance with the computing system (500) of FIG. 5A and the nodes (522) of FIG. 5B. The repository (142) may be hosted by a cloud services provider for the web provider operating the server application (134). The cloud services provider may provide hosting, virtualization, and data storage services as well as other cloud services and the web provider may operate and control the data, programs, and applications that store and retrieve data from the repository. The data in the repository (142) may include the location data (144) and the profile information (146). The location data (144) in the repository (142) includes location data sent from user devices (e.g., the device A (102) and the device B (112)) that identifies the location of the user devices and which may be present on overwatch devices (e.g., the device X (122)). The profile information (146) includes information about the users of the user devices (e.g., the device A (102) and the device B (112)), including user credentials for verifying access to the system (100), user identifiers for uniquely identifying the users of the system (100), entity identifiers for identifying entities for which a user may work, job identifiers for identifying jobs that users are working on for the entities, etc.

Figure 2A:
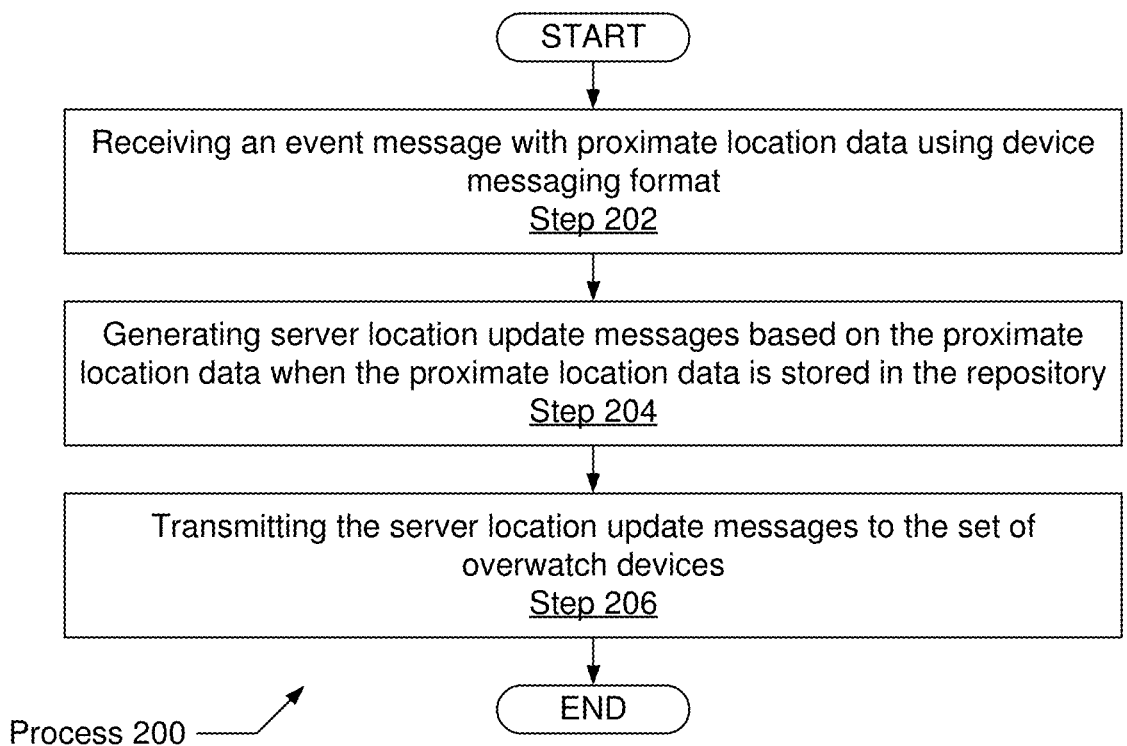
FIGS. 2A and 2B show flowcharts in accordance with disclosed embodiments.
Figure 2B:
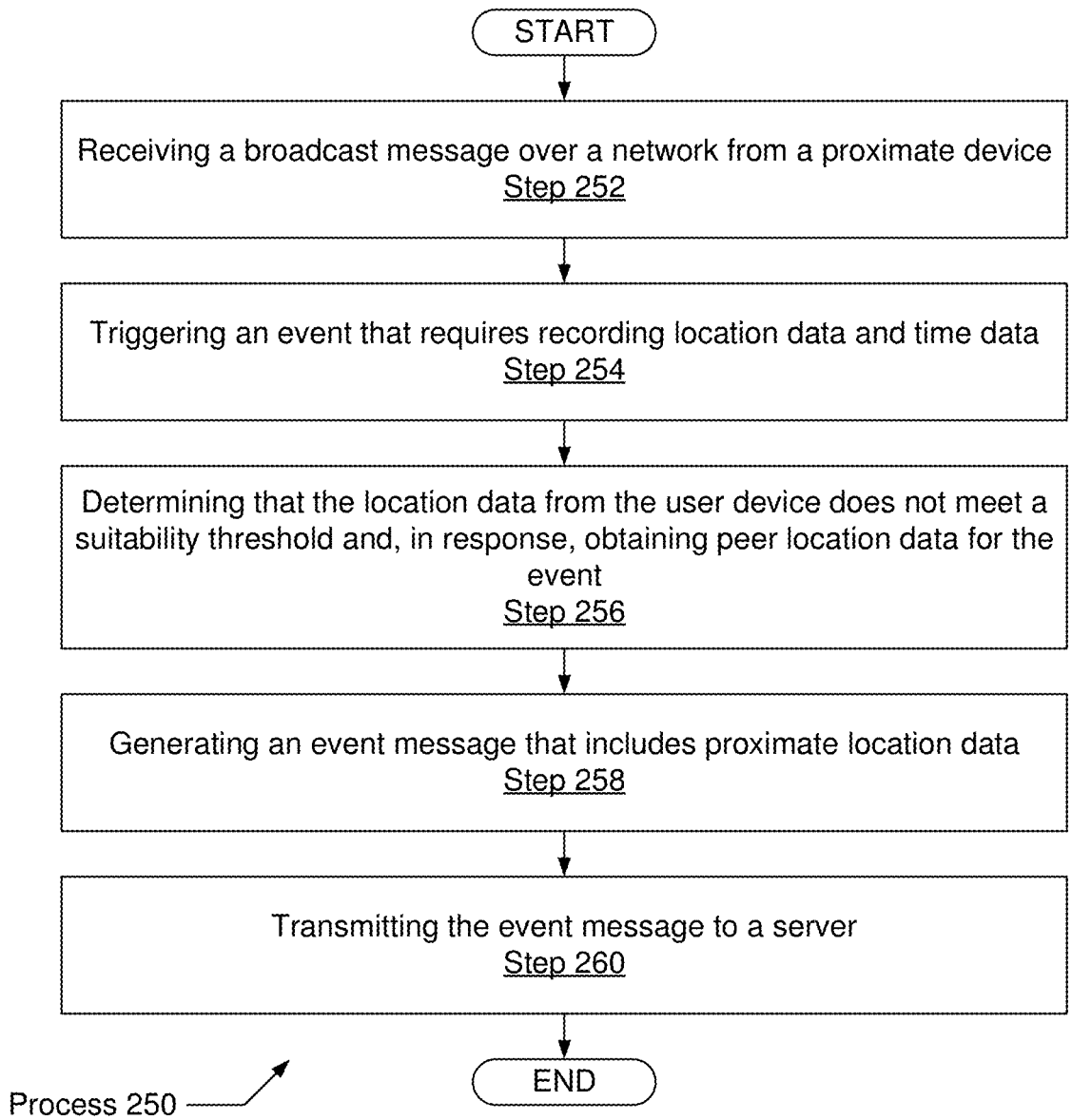

FIG. 2A and FIG. 2B show flowcharts of the process (200) and the process (250) in accordance with the disclosure. The process (200) of FIG. 2A receives, by a server, data from user devices and transmits the data to overwatch devices. The process (250) of FIG. 2B establishes connections between user devices and proximate devices to share information and connections. The embodiments of FIG. 2A and FIG. 2B may be combined and may include or be included within the features and embodiments described in the other figures of the application. The features of FIG. 2A and FIG. 2B are, individually and as an ordered combination, improvements to the technology of computing systems and communications technology. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) may be performed by a server. The server receives data and information about locations and events, converts the data and information from the protocols and formats used by the devices sending the data and information, stores the standardized data and information to the repository, and generates and transmits notifications and messages that include the updated data and information to devices of the system.

At Step 202, an event message with proximate location data in a user device messaging format is received by the server. The proximate location data was received by the user device from a proximate device over a wireless personal area network. The user device messaging format identifies the types of data in the event messages and the ordering of the data within the event message.

The proximate location data may be received by the user device from a proximate device in a proximate device location response. The proximate device location response was transmitted in response to a user device location request that included a location response code value, a latitude value, a longitude value, an accuracy value, and a date value.

The user device performs several steps to receive the proximate location data from the proximate device. The user device receives a broadcast message from the proximate device. The user device establishes a connection over the wireless personal area network to the proximate device. The user device requests the proximate location data from the proximate device over the connection with a user device location request. The user device receives the proximate location data from the proximate device in a proximate device messaging format in a proximate device location response. The user device converts the proximate location data from a proximate device messaging format to a user device database format. The user device stores the proximate location data in the user device database format.

In one embodiment, the user device may transmit the user device event message to the proximate device over the wireless personal area network. The proximate device then transmits the user device event message to the server using a mobile network.

The user device may receive from a proximate device a proximate device broadcast message that includes a service identifier formed as a universally unique identifier (UUID). The service identifier may include a base value, a children count value, and an entity identifier value. The base value of the service identifier may include a prefix UUID that is selected by the implemented, and which may be randomly selected. As an example, a randomly selected prefix UUID may be "a9c48294-5e30-11ea-bc56".

Additionally, the user device may select the proximate device as a parent device based on one or more of a children count value from the parent device and a signal strength value for the parent device. For example, the user device may receive several children count values from other proximate devices with different signal strengths. The user device may select the proximate device with the highest children count value as the parent device. If multiple proximate devices have the same highest children count value, then the user device may select the proximate device with the most children and the highest signal strength as the parent device. Parent and child devices may handle the sharing of location and network connections, as described further below.

The proximate location data is converted from the user device messaging format to a server database format. The server database format is the format used by the server to store information into a repository or database and may define the data types and enumerate the different values of the data.

The proximate location data is stored as a user location of the user device in a repository using the server database format.

Turning back to the process (200) at Step 204, after receiving a user updates request from a set of overwatch devices, a set of server location update messages based on the proximate location data are automatically generated by the server. The set of server location update messages may be generated when the proximate location data is stored in the repository. The user updates requests are messages from overwatch devices requesting to view the updates to user devices.

At Step 206, the set of server location update messages are transmitted to the set of overwatch devices by the server. The set of server location update messages are transmitted after automatically generating the set of server location update messages.

Additionally, the server may receive, from the user device, a user device registration message that includes a user identifier identifying a user and a device identifier identifying the user device. The device registration message uses a user device messaging format for the user identifier and for the device identifier. The registration message from the user device registers the user device with the server so that the location data, profile updates, events, and messages from the user device may be shared with the other devices of the system, including the overwatch devices.

The server may also receive a device update message from the user device with updated profile information. The device update message uses the user device messaging format for the updated profile information. The device update message may update the profile information for the user of the user device to identify entities or jobs for which the user is working.

After receiving the device update message from the user device, the server converts the updated profile information from the user device messaging format to the server database format. The server database format may be a "standardized" format with certain data values and fields in certain columns and restrictions on the size and types of fields. The other formats (e.g., the formats used by the other devices including the user devices, proximate devices, and overwatch devices) may be "non-standardized" formats having no restrictions on how the data is stored and which may be different from the standardized format. For example, the non-standardized formats may use JavaScript object notation (JSON) strings of unfixed sizes. Different devices using different hardware (chipsets) and different software (operating systems) may use different formats for storing the data on devices, which may store data using different endianness, memory addressing schemes, and relative memory locations and for the transport protocols/formats to communicate the information.

After converting the updated profile information from the user device messaging format to the server database format, the server may store the updated profile information in a repository using the server database format.

After receiving a profile updates request from a set of overwatch devices, the server may automatically generate a set of server update messages based on updated profile information when the updated profile information is stored in the repository. The server update messages may use a plurality of overwatch device messaging formats corresponding to the set of overwatch devices.

After automatically generating the server update messages with multiple overwatch device messaging formats, the server transmits the server update messages to the set of overwatch devices. The server transmits the set of server location update messages to the set of overwatch devices. The proximate location data may then be displayed by a first overwatch device from the set of overwatch devices in response to receiving a server location update message.

Turning to FIG. 2B, the process (250) may be performed by a user device. The user device triggers events, receives broadcast messages, establishes connections with other devices, gathers location data, and transmits data and information to a server, as further described below.

At Step 252, the user device receives a broadcast message from a proximate device over a wireless personal area network.

At Step 254, the user device triggers an event that requires recording location data and time data.

At Step 256, the user device determines that the location data available from the user device does not meet a suitability threshold and, in response, obtains proximate location data for the event from a proximate device. As discussed further below, the suitability threshold may not be met when the user device is unable to generate location data (e.g., cannot receive satellite signals) or is unable to generate location data with sufficient accuracy (e.g., an accuracy of 30 meters).

The user device establishes a connection over the wireless personal area network to the proximate device. The user device requests the proximate location data from the proximate device over the connection with a user device location request.

The user device receives the proximate location data from the proximate device in a proximate device messaging format in a proximate device location response from the proximate device. The proximate device location response includes a location response code value, a latitude value, a longitude value, an accuracy value, and a date value.

The user device converts the proximate location data from the proximate device messaging format to a user device database format. The user device stores the proximate location data in a user device repository in the user device database format.

Turning back to the process (250), at Step 258, the user device generates a user device event message using the proximate location data. The user device event message may be automatically generated when the proximate location data is stored in the user device repository.

At Step 260, the user device transmits the user device event message. The user device may transmit the event message to the server over a mobile network. Additionally, the user device may transmit the user device event message to the proximate device over the wireless personal area network. The proximate device may then transmit the user device event message to a server using the mobile network.

Figure 3A:
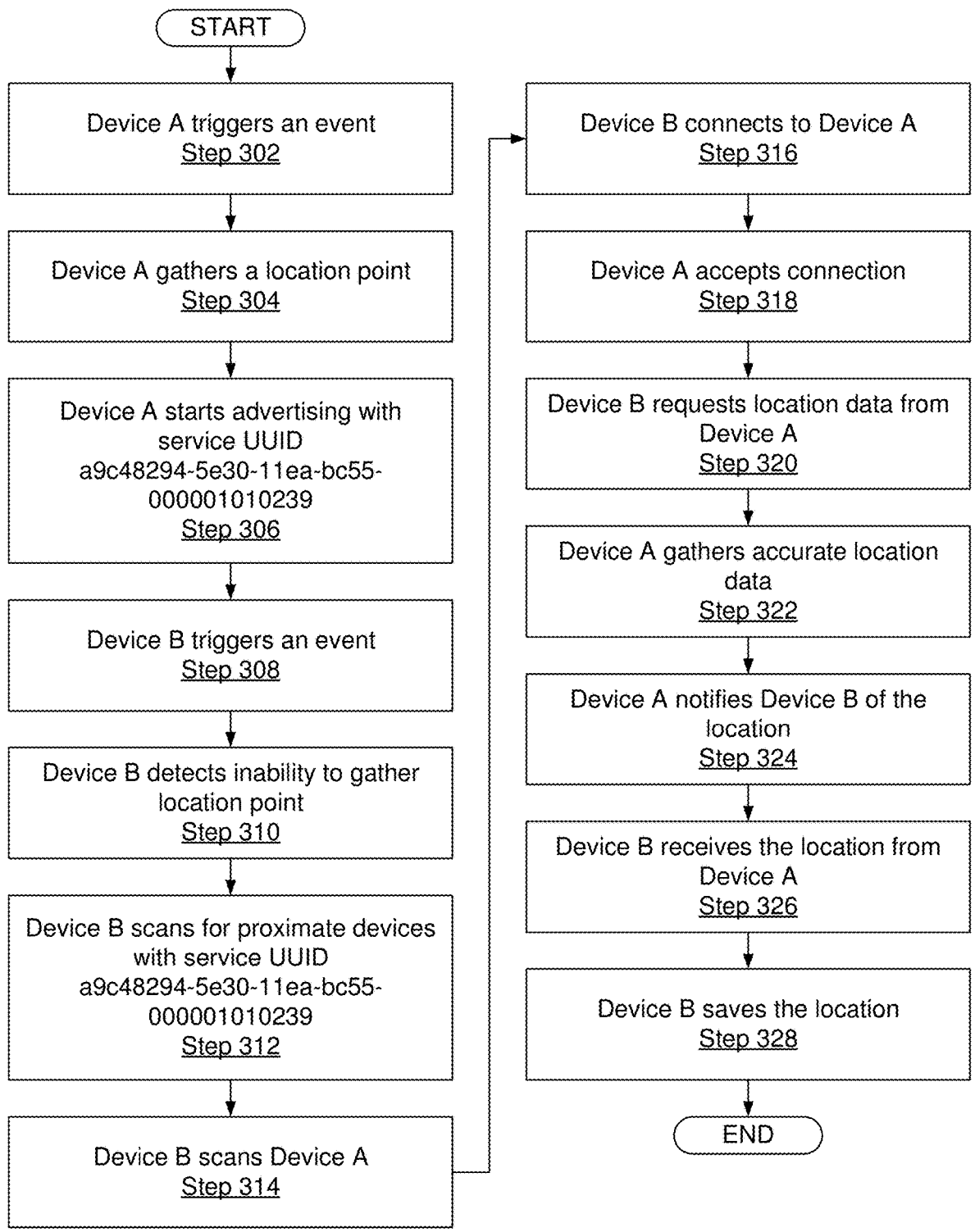
FIG. 3A, FIG. 3B, and FIG. 3C show examples in accordance with disclosed embodiments.
Figure 3B:
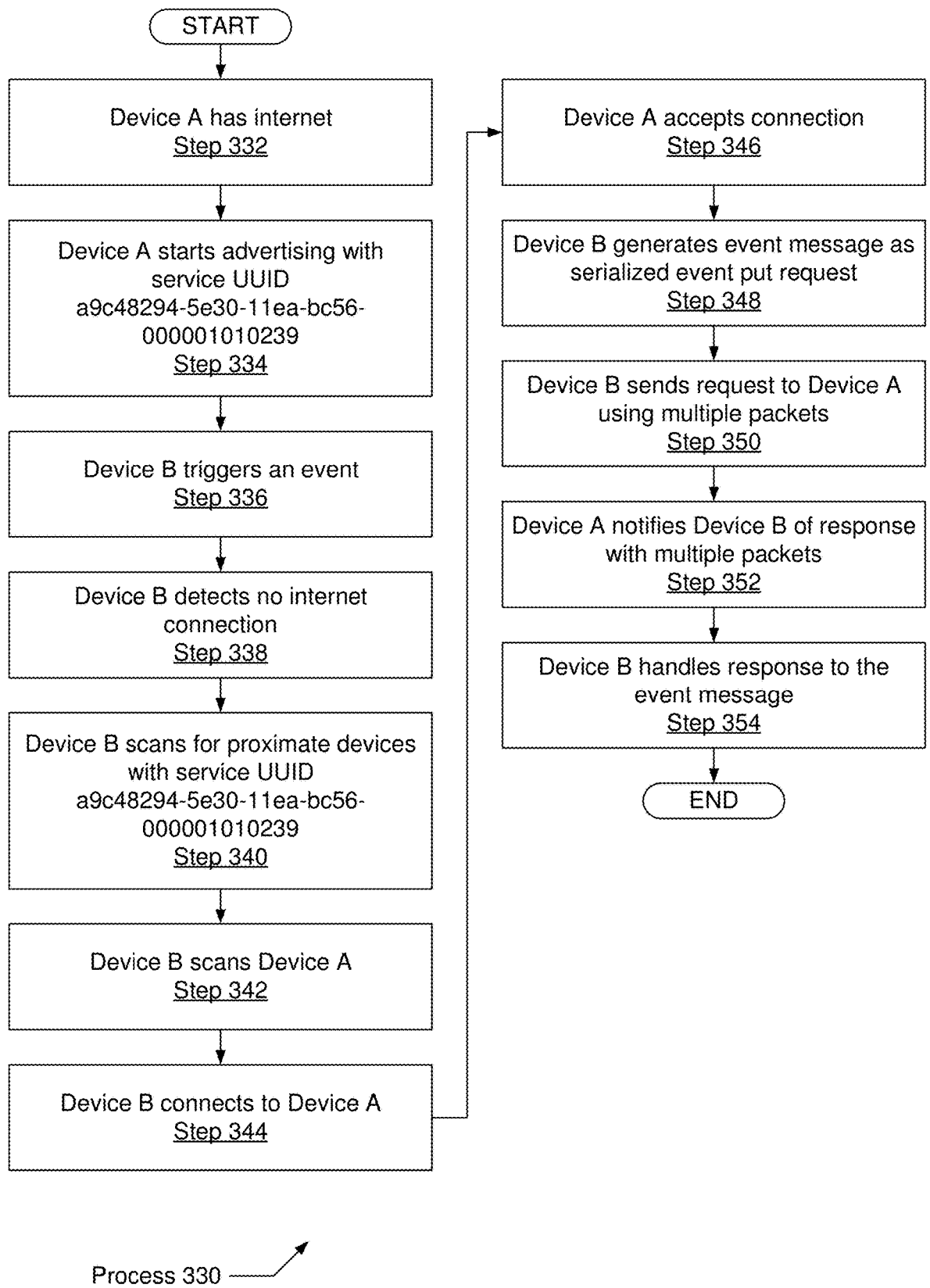
Figure 3C:
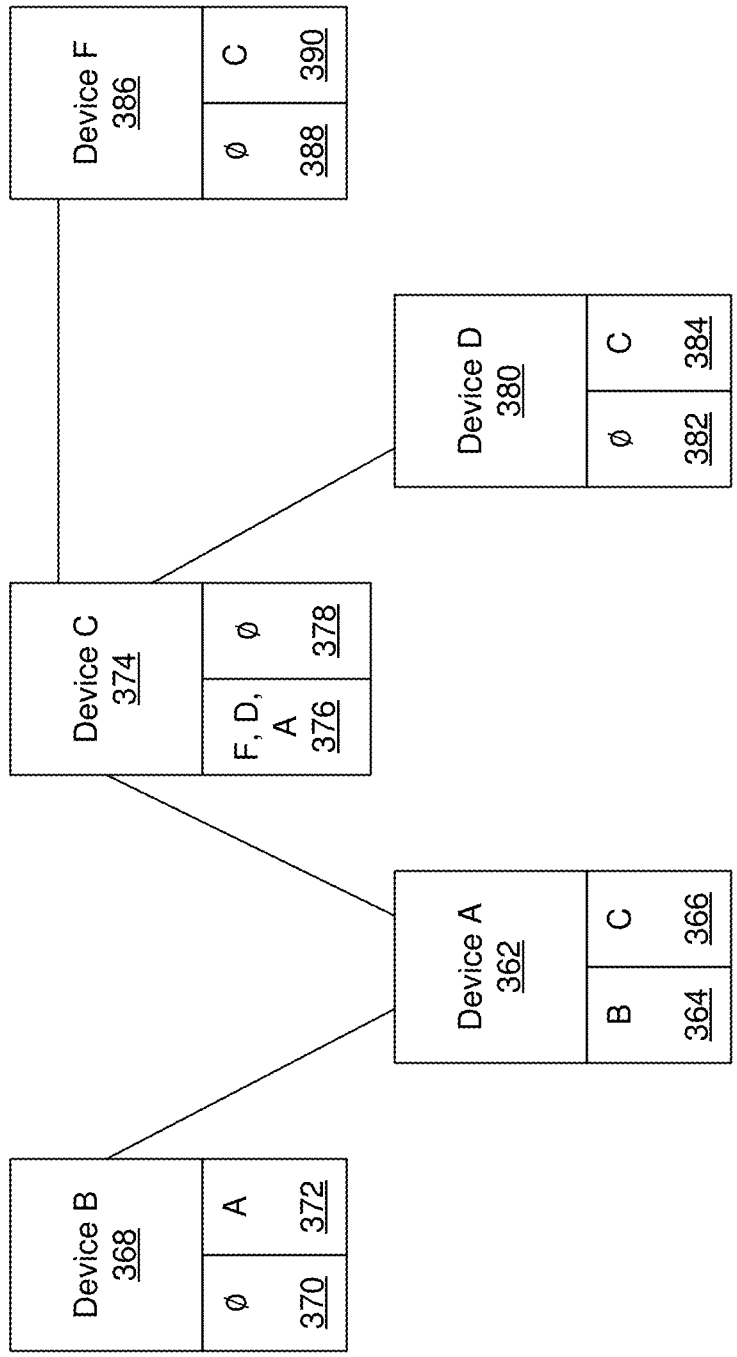
Figure 4A:
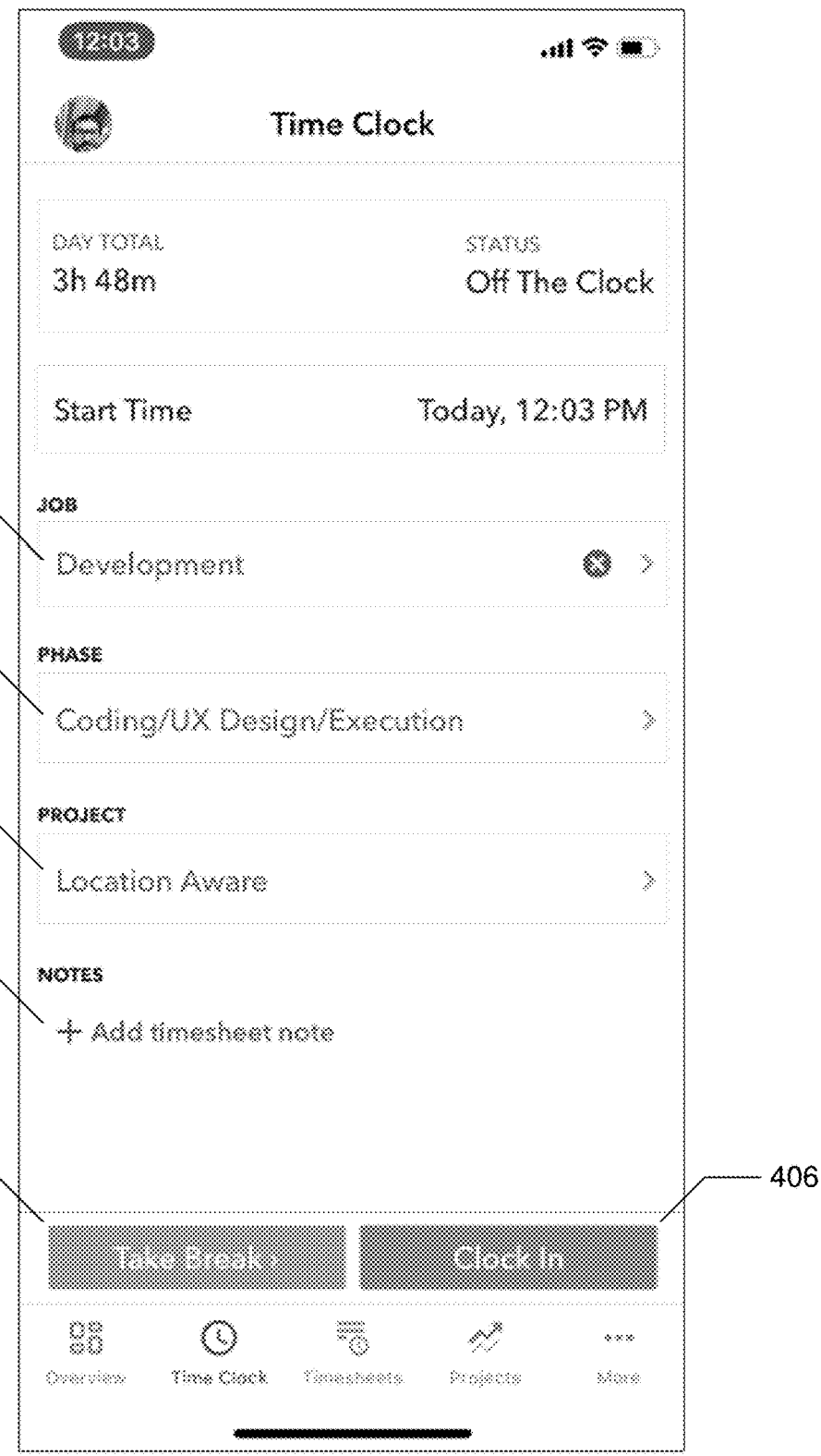
FIG. 4A, FIG. 4B, FIG. 4C, FIG. 4D, FIG. 4E, and FIG. 4F show examples in accordance with disclosed embodiments.
Figure 4B:
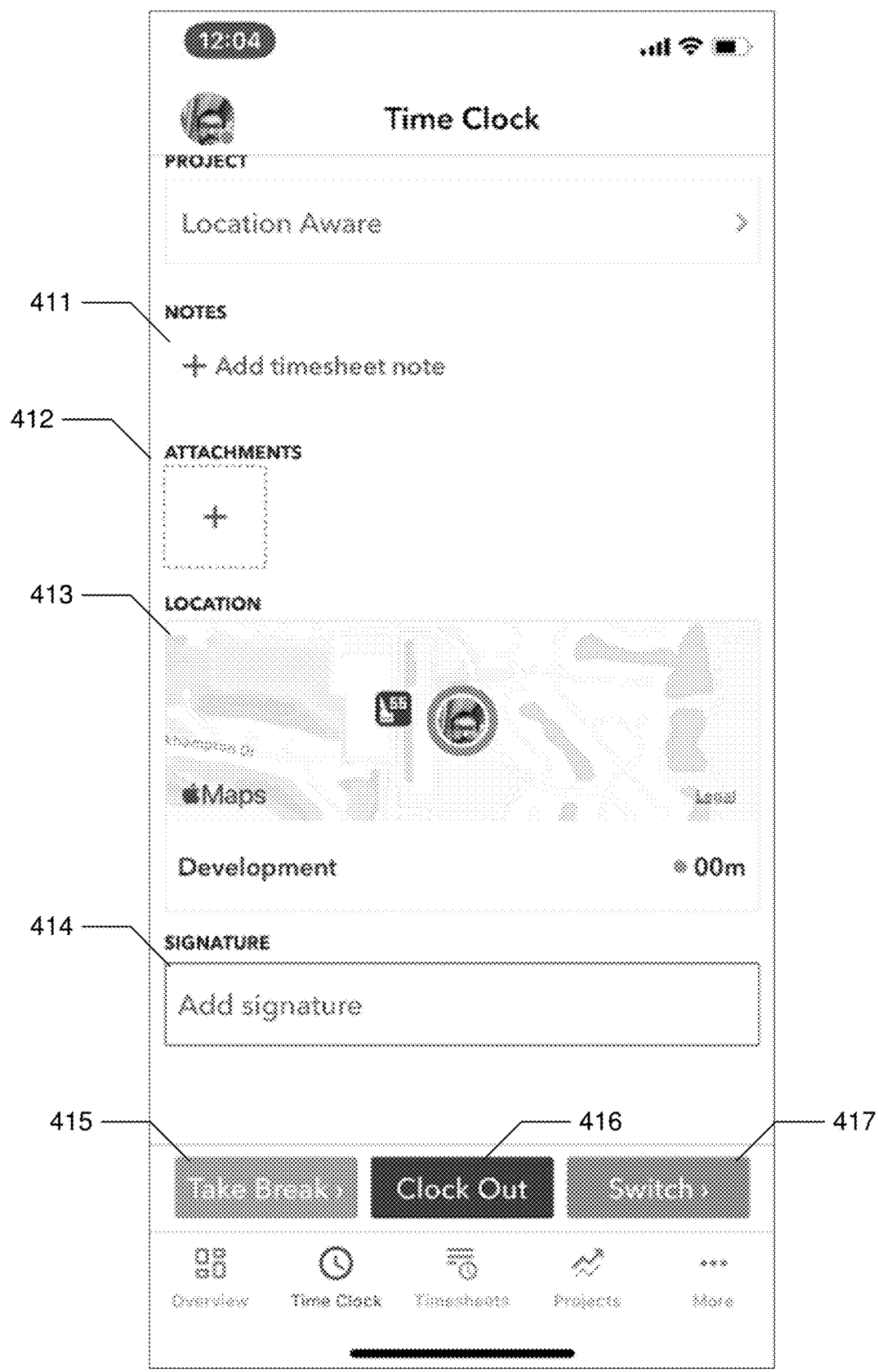

FIG. 3A, FIG. 3B, FIG. 3C, FIG. 4A, FIG. 4B, FIG. 4C, FIG. 4D, FIG. 4E, and FIG. 4F show examples of methods, systems, and interfaces in accordance with the disclosure. FIG. 3A shows a process for sharing location data between devices. FIG. 3B shows a process for sharing network connections between devices. FIG. 3C shows a diagram of a group of devices sharing data and connections after selecting parent devices. FIG. 4A and FIG. 4B show user interfaces used by user devices and proximate devices. FIG. 4C, FIG. 4D, FIG. 4E, and FIG. 4F show user interface screens used by overwatch devices. The embodiments of FIG. 3A, FIG. 3B, FIG. 3C, FIG. 4A, FIG. 4B, FIG. 4C, FIG. 4D, FIG. 4E, and FIG. 4F may be combined and may include or be included within the features and embodiments described in the other figures of the application. The features and elements of FIG. 3A, FIG. 3B, FIG. 3C, FIG. 4A, FIG. 4B, FIG. 4C, FIG. 4D, FIG. 4E, and FIG. 4F are, individually and as a combination, improvements to the technology of computing systems and communication technology. The various features, elements, widgets, components, and interfaces shown in FIG. 3A, FIG. 3B, FIG. 3C, FIG. 4A, FIG. 4B, FIG. 4C, FIG. 4D, FIG. 4E, and FIG. 4F may be omitted, repeated, combined, and/or altered as shown. Accordingly, the scope of the present disclosure should not be considered limited to the specific arrangements shown in FIG. 3A, FIG. 3B, FIG. 3C, FIG. 4A, FIG. 4B, FIG. 4C, FIG. 4D, FIG. 4E, and FIG. 4F.

Turning to FIG. 3A, the process (300) shares location data between device A and device B. In Step 302, the device A triggers an event. For example, a user, Alice, may select a "clock-in" button displayed by an application on the device A.

In Step 304, the device A gathers a location point (also referred to as location data). The location point may include global positioning system coordinates (values for longitude, latitude, and altitude) that are gathered from a device location component (e.g., a global positioning system module) of the device A.

In Step 306, the device A starts advertising with a service identifier (also referred to as a service universally unique identifier (UUID) or service UUID) with a value of "a9c48294-5e30-11ea-bc55-000001010239". The service identifier includes the base "a9c48294-5e30-11ea-bc55" and an entity identifier of "1010239". The device A may periodically (e.g., at each minute) send a broadcast message with the service identifier using a wireless personal area network protocol (e.g., Bluetooth low energy (BLE)).

In Step 308, the device B triggers an event. For example, a user, Bob, may select a "clock-in" button displayed by an application on the device B. The applications on the device A and the device B may be the same application and Alice and Bob may be working for the same entity on the same job.

In Step 310, the device B detects an inability to gather a location point. For example, the location data from the device B may not meet a suitability threshold in that the location data may not be available (e.g., the application on the device B may not have the correct permissions or the device location component may not be functioning correctly) or may not meet an accuracy threshold (e.g., an accuracy threshold of 50 meters or less).

In Step 312, the device B scans for proximate devices with the service identifier with a value of "a9c48294-5e30-11ea-bc55-000001010239". Bob works for the same entity and on the same job as Alice and so the device B is looking for the same service identifier. The device B scans by listening for messages transmitted using the wireless personal area network protocol.

In Step 314, the device B scans the device A. The device B receives the broadcast message sent from device A with the same service identifier of "a9c48294-5e30-11ea-bc55-000001010239".

In Step 316, the device B connects with the device A. The connection is made using the wireless personal area network protocol to form a wireless personal area network between the device B and the Device A. To connect, the device B sends a connection request to the device A.

In Step 318, the device A accepts the connection. After accepting the connection, the device A may send an acknowledgement message to the device B to indicate that the connection is established.

In Step 320, the device B requests location data from the device A. The device B (operating as a user device) may send a user device location request to the device A (operating as a proximate device).

In Step 322, the device A gathers accurate location data. The location data for device A may be gathered from a device location component (e.g., a global positioning system module) of the device A.

In Step 324, the device A notifies the device B of the location. The device A may transmit a proximate device location response that includes a response code value, a latitude value, a longitude value, an accuracy value, and a date value. For example, the proximate device location response may include a response code with an 18 byte payload as shown in the table below.

TABLE 1

| Data type | Byte length | Example | Meaning |
|---|---|---|---|
| Response code | 1 byte | 0x01 | Success |
| Latitude | 4 bytes | 0xc22cfae1 | −43.245 |
| Longitude | 4 bytes | 0x42e8dc29 | 116.43 |
| Accuracy | 2 bytes | 0x000a | 50 meters |
| Date | 8 bytes | 0x00000170A6467400 | Mar. 4, 2020 9am |

Possible values for the response code include "Success" with a value of 0x01 and "Failure" with a value of "0x00".

In step 326, the device B receives the location data from the device A. The device B receives the proximate device location response transmitted by the device A using the connection over the wireless personal area network.

In Step 328, the device B saves the location data. The device B converts the location data from the proximate device location response from the proximate device messaging format to a user device database format and stores the location data in a repository or data store on the device B.

Turning to FIG. 3B, the process (330) shares network connections. In Step 332, the device A has an internet connection. The internet connection may be established over a mobile network (4G or 5G network).

In Step 334, the device A starts advertising with a service identifier with a value of "a9c48294-5e30-11ea-bc56-000001010239". The service identifier includes the base "a9c48294-5e30-11ea-bc56" and an entity identifier of "1010239". This service identifier is for the network sharing service, which is different from the service identifier for the location sharing service in that the location sharing service described in FIG. 3A included the value " . . . -bc55- . . . " in the service identifier, whereas the service identifier for the network sharing service includes the value " . . . -bc56- . . . ". The device A may periodically (e.g., every one minute) send a broadcast message with the service identifier using a wireless personal area network protocol (e.g., Bluetooth low energy (BLE)).

In Step 336, the device B triggers an event. Example events include a "clock-in" event, a "clock-out" event, a location gathering event, etc. For example, a user, Bob, may select a "clock-in" button displayed by an application on the device B. The applications on the device A and the device B may be the same application and Alice and Bob may be working for the same entity on the same job.

In Step 338, the device B detects no internet connection. For example, the device B may identify that it is not connected to a mobile network and is unable to send and receive messages to and from other devices (e.g., the server) through the internet.

In Step 340, the device B scans for proximate devices with the service identifier with a value of "a9c48294-5e30-11ea-bc56-000001010239". Bob works for the same entity and on the same job as Alice and so the device B is looking for the same service identifier as that being broadcast by the device A. The device B scans by listening for messages transmitted using the wireless personal area network protocol.

In Step 342, the device B scans the device A. The device B receives the broadcast message sent from device A with the same service identifier of "a9c48294-5e30-11ea-bc56-000001010239".

In Step 344, the device B connects with the device A. The connection is made using the wireless personal area network protocol to form a wireless personal area network between the device B and the Device A. To connect, the device B sends a connection request to the device A.

In Step 346, the device A accepts the connection. After accepting the connection, the device A may send an acknowledgement message to the device B to indicate that the connection is established.

In Step 348, the device B generates an event message as a serialized event put request. The event message includes several bytes of data that identify the "clock-in" event and provides other data for the event (e.g., the location and time of where and when the event was triggered, a user identifier, a device identifier, etc.). The event message may be placed into a hypertext transport protocol (HTTP) put request that is then serialized (i.e., converted to binary form).

In one embodiment, the device B may send an event message to the server as an HTTP request through the device A and use a packet format of:

[Packets remaining] [null terminated payload bytes]

As an example, a serialized request may have a payload of the following 22 bytes:

0x45c4 d8cd 3be5 a384 97a3 39d3 eb34 103e 47dc 1ec5 b76a

With a payload byte limit of 20 bytes, the payload above is split into two packets:

Packet 1:
Packets remaining: 0x0100 (indicating that 1 packet is remaining)
Payload: 0x45c4 d8cd 3be5 a384 97a3 39d3 eb34 103e 47dc Packet 2:
Packets remaining: 0x0000 (indicating that 0 packets are remaining)
Payload: 0x1ec5 b76a 0000 0000 0000 0000 0000 0000 0000

When a packet is received by the passthrough device (e.g., the device A), the passthrough device returns a response code of 0x01 to let the sending device know that the next packet may be sent. If 0x00 is returned by the passthrough device, there was an error in the transmission and the sending device is to resend the packet up to a retransmission threshold number of times (e.g., 5 retransmission attempts).

When a passthrough device receives a response for a passed through request, the passthrough device sends the response to the sending device (the device that sent the request to the passthrough device, there can be multiple layers of passthrough devices) using the same protocol that was used to send the request (e.g., the protocol described above). Any errors with the request itself (i.e., between the original sending device and the destination server) may be handled by the sending device and not by the passthrough device.

In Step 350, the device B sends the request to the device A using multiple packets. The event message and corresponding put request may include more data than can fit into a packet for transmission over the wireless personal area network. The event message (after being serialized) is packetized into multiple transport layer packets according to the wireless personal area network protocol and the packets are then transmitted to the device A. The device A may reconstruct and re-packetize the put request to transmit the put request to the server using the mobile network protocol.

In Step 352, the device A notifies the device B of a response with multiple packets. The response to the put request may be larger than a single packet and the response may be packetized by the device A and then transmitted to the device B.

In Step 354, the device B handles the response event message sent in a put request. The response may indicate that the event message was successfully received or include an error code to indicate that the event message was not successfully received and recorded.

Turning to FIG. 3C, a group of devices form the network (360) with multiple parent relationships and child relationships. Location data and network connections are shared through the network (360) using the parent and child relationships. Each device (the device A (362), the device B (368), the device C (374), the device D (380), and the device F (386)) in the network (360) has a list (364, 370, 376, 382, 388) of children device identifiers and a parent device identifier (366, 372, 378, 384, 390). For example, the device A (362) includes the list (364) of child devices and the parent identifier (366). The list (370) of the device B (368) is empty indicating that the device B (368) has no children. The parent identifier (378) of the device C (374) is empty indicating that the device C (374) has no parent. The device C (374) may be identified as a root device of the tree of the network (360). The device A may be identified as a root device of a subtree of the network (360).

Selecting a parent device includes several operations. Every update threshold length of time (e.g., 1 minute) each device reevaluates and updates the parent device identifier by scanning for any devices within the transmission range of the wireless personal area network protocol for other devices that have the same or higher children count values. The device scanning for broadcast messages is referred to as a scanning device.

If another device is found with the same or higher children count value, then the scanning device "subscribes" to the device that transmitted the broadcast message having the highest children count value to become a child device of the other device. If multiple other devices are found having the highest children count value, the scanning device selects the device with the highest children count and the best signal strength. A device does not subscribe to one of its children.

To subscribe to a parent device, the scanning device connects to the parent over the wireless personal area network. The scanning device then sends a user identifier of the scanning device to the subscribe characteristic of the parent device (described below). In one embodiment, the user identifier is an 8 byte number (e.g., an unsigned integer).

After successfully receiving the user identifier from the scanning device, the parent device notifies the scanning device (now a child device) that the parent device has received the subscription by sending a subscription response code value of 0x01 back to the child.

The parent will save the user identifier of the child device in a list of child device identifiers. As an example, the list may be a dictionary with key value pairs of "<NetworkAddressOfChild, dateConnected>". The child device saves the parent device identifier, which may be in a dictionary with the key value pair "<NetworkAddressOfParent, dateConnected>".

The parent device and the child device then disconnect but may reconnect to share location data and transmit or relay messages. After a drop threshold length of time (e.g., two minutes), the connection between a parent device and a child device expires, the parent device removes the user identifier of the child device from the list of child device identifiers, and the child device removes the parent device identifier.

As an example of the subscription mechanism, a generic attribute (GATT) profile of the Bluetooth low energy (BLE) specification may be used. Each device in the wireless personal area network has a set of services that act as offerings from the device. Each service comprises "characteristics" that serve as endpoints for data transactions. Each characteristic can be set to be written to, to be read from, or to be notified from. An embodiment of a service with a subscription characteristic (i.e., for parent selection) and a location request characteristic (for location data requests) is shown below. Additional characteristics may be added, such as a characteristic for sharing network connections and transmitting event messages.

Service
  Service identifier: a9c48294-5e30-11e0-XXXX-ZZZZZZZZZZZZ

X->Children count value of the device transmitting the service identifier

Z->user identifier of the device transmitting the service identifier

Characteristic—subscription

Request type(s): Write, Notify

UUID: 2562e77a-6add-11ea-bc55-0242ac130003

Description: write an 8 byte number to subscribe, will notify with 0x01 if successful, 0x00 if not successful.

Characteristic—Location Request

Request type(s): Write

Service identifier: UUID: 2562e77a-6add-11ea-bc55-0242ac130004

Description:
  Write 0x01 to pass a location request to the root.
  Write 0x02 [Location] To pass a valid location (to be saved by device).
  Write 0x03 to pass a request to gather location data and send the location data back.
  Write 0x04 to signal that location data from each child have been sent.
  Write 0x05 [Location] for a location that needs to be sent to root.
  Where [Location]=[latitude—4 bytes, longitude—4 bytes, accuracy—2 bytes, date—8 bytes].

Gathering location data by a device includes several operations. In the wireless personal area network that includes multiple parent or child devices, when a device (referred to as a gathering device) gathers location data, the gathering device connects to the parent device of the gathering device using the known address of the parent device (e.g., the parent device identifier) and, for example, posts a request to the location request characteristic. The request is posted by writing the value 0x01. The location request is relayed through the tree of the wireless personal area network (e.g., the network (360)) until the root device of the network receives the location request.

When the root device receives the location request, the root device determines if the root device has current location data that is recent and valid (e.g., less than 1 minute old). If the location data of the root device is valid and recent, then the root device sends the current location data down the network to the child devices (i.e., devices that are not the root device) in the network by sending, for example, 0x02 [Latitude—4 Bytes, Longitude—4 Bytes, Accuracy—2 Bytes, Date—8 Bytes].

If the location data of the root device is not valid and recent, then the root device sends a request to each child device of the root device to gather location data. The root device writes [0x03] to the location request service characteristic.

In response, each child device of the root device relays the request to their child devices and so on. After receiving the location request, each child device gathers location data, which is then sent back through the parent devices to the root device by writing 0x05 [Latitude—4 Bytes, Longitude—4 Bytes, Accuracy—2 Bytes, Date—8 Bytes] to the location request service characteristic.

After sending a response with location data, each child then sends 0x04 to the parent device of the child device. When a parent device has received 0x04 code from each child device in the subtree of the network of parent devices, the parent device sends a 0x04 to its parent device. When the root receives 0x04 from each of its child devices, the root device processes the location points gathered and selects one of the location points, which is then sent back out to the child devices by writing 0x02 [Latitude—4 Bytes, Longitude—4 Bytes, Accuracy—2 Bytes, Date—8 bytes] to the location request service characteristic. An example of the location point selection method is described further below. The root may wait for a pause threshold (e.g., 30 seconds) before proceeding to send out the selected location point to the devices in the wireless personal area network.

Selection of the current location data by the root device is performed with a sequence of operations to identify the location point that describes the current location of the root device and the network (360). The root device creates a bucket for each location point from the child devices. For each given point, copy each point that is within a threshold distance (e.g., 40 meters) into the bucket of the given point. Identify the bucket with the most points. If multiple buckets have the most points, choose the bucket whose original point has the highest accuracy. The points below include latitude, longitude, and accuracy data from four devices.

Point 1: (43.2, −116.4, 50 m)
Point 2: (43.9, −148.2, 20 m)
Point 3: (43.201, −116.401, 40 m)
Point 4: (43.198, −116.398, 45 m)

The points above are put into the buckets below based on the distance between points being less than the threshold distance. The points 1, 3, and 4 are each less than the threshold distance away from each other and point 2 is more than the threshold distance away from the other points.

Bucket 1: Points 1, 3, 4
Bucket 2: Points 2
Bucket 3: Points 3, 1, 4
Bucket 4: Points 4, 1, 3

The buckets 1, 3, and 4 have the most points and the point 3 is selected because it is in a bucket with the most points (3 points) and has the highest accuracy (40 meters).

As an example of selecting a parent device, prior to the connections being formed between the device B (368), the device A (362), and the device C (374), the device B (368) triggers a "clock-in" event and scans for nearby devices. As a part of "clocking-in", the device B (368) begins transmitting broadcast messages to look for other devices and form a network using a wireless personal area network protocol. The broadcast messages from the device B (368) indicate that the device B has an empty list (370) of children device identifiers. The broadcast message includes a service identifier (e.g., "a9c48294-5e30-11e0-0000-000001010239") with a base ("a9c48294-5e30-11e0"), children count value ("0000"), and entity identifier ("000001010239")

The device B (368) scans the device A (362). The service identifier from the broadcast message from the device A (362) may be the same as the service identifier from the broadcast message from the device B (368) since both devices have children count values of 0.

The device B (368) scans the device A (362) first. For example, the device B (368) receives the broadcast message from the device A (362) before the device A (362) receives the broadcast message from the device B (368). The device B (368) connects to the device A (362) and becomes a child of the device A (362). The device B (368) sets the parent identifier (372) to identify the device A (362). The device A (362) updates the list (364) of child devices to include the device B (368). Periodically (every 30 seconds, 1 minute, 90 seconds, etc.), the device B (368) and the device A (362) may reevaluate their status and connections with other devices and continue to transmit broadcast messages.

After joining with the device B (368) and prior to joining the network (360), the device A (362) scans the device B (368), the device C (374), and the device D (380). The broadcast message from the device C (374) indicates that the device C (374) has the largest children count value as compared to the children count values from the broadcast messages from the device B (368) and from the device D (380). The device A (362) connects to the device C (374) and becomes a child of the device C (374) to form the network (360). The device A (362) updates the parent device identifier (366) to identify the device C (374) and the device C (374) updates the list (376) of child devices to include the device A (362) as a child device.

After forming the network (360), location data and network connections may be shared. For example, the device B (368) may request a location point (i.e., location data) from the parent device (i.e., the device A (362)) to complete the "clock-in" event. The device B (368) may also request a network connection to transmit the event message for the "clock-in" event.

To gather the location point, the device B (368) sends a request to the device A (362) (the parent device of the device B (368)) requesting a location point. The device A (362) relays the request to the device C (374) (the parent device of the device A (362)).

A root device (e.g., the device C (374)) saves previously gathered location points and distributes the previously gathered most recent location point when less than a threshold amount of time old (e.g., less than 60 seconds old). If the device C (374) has a recent location, then the device C (374) sends the location in response to the request originally from the device B (368). Otherwise, the device C (374) requests location data from the devices in the list (376) of child devices. Each child device gathers location data and returns the location data to their respective parent device, which may relay the information to the root device. The device C (374) selects current location data from the location data returned by the child devices.

Turning to FIG. 4A, the user interface (400) is a graphical user interface displayed on a device (a smartphone, a tablet computer, a personal computer, etc.) for updating profile information of the user using the device. The user may select a job, phase, and project; and add a note with the user interface elements (401), (402), (403), (404) presented in the user interface (400). The user may also trigger events with the user interface elements (405) and (406). In response to interaction with the user interface elements (401), (402), (403), (404), changes to the job, phase, project, and notes may be sent to a server, which may convert and store the changes to a repository and then generate and send notifications to other devices with the changes.

The user interface elements (405) and (406) (i.e., the "Take Break" button and the "Clock In" button) trigger events when selected. To process the triggered events, the device may send information to the server with location data. As an example, after selection of the "Clock In" button, the device gathers a location point and timestamp that are sent to the server, which converts and stores the event information in a repository. In response to the updates to the repository, the server may send notifications to other devices with the event information.

Turning to FIG. 4B, the user interface (410) is displayed after a user has selected the "Clock In" button (the user interface (406)) from FIG. 4A. The user interface (410) is updated from the user interface (400) of FIG. 4A to include the user interface elements (411), (412), (413), (414), (415), (416), and (417). The user interface elements (411) and (412) add notes and attachments to the job, phase, and project of the user. The user interface element (413) shows a map of the current location of the device of the user. The user interface element (414) may be an edit box to receive a signature of the user that may be included with the event message generated when the "Clock Out" button (the user interface element (416)) is selected.

Selection of the "Take Break" button (the user interface element (415)) generates an event message to stop billing time to the current project that is sent to the server. Selection of the "Clock Out" button (416) generates an event message to stop billing time and close out the current project. Selection of the "Switch" button (417) keeps billing time for the user and while selecting a different job, phase, or project to which the time is billed.

Figure 4C:
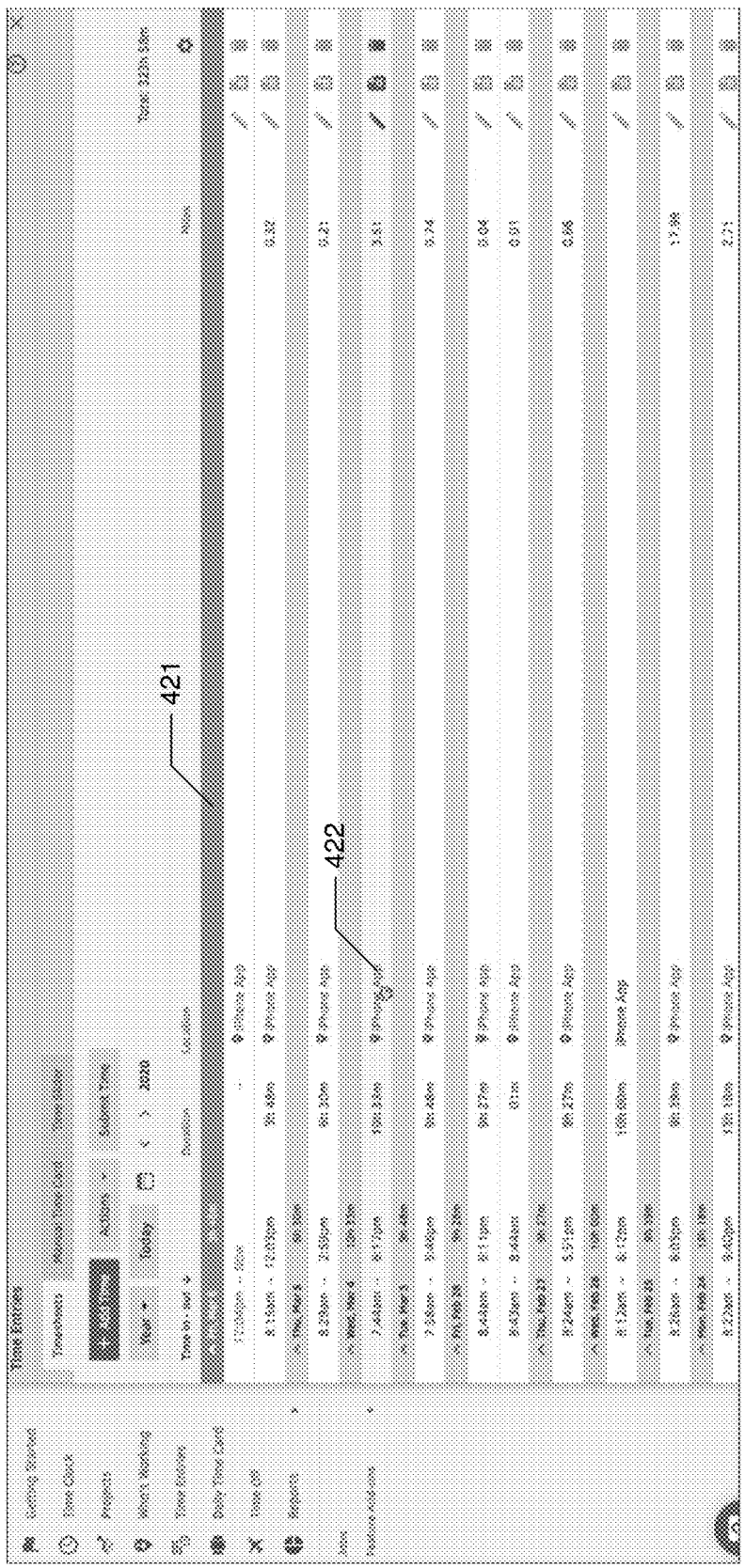

Turning to FIG. 4C, the user interface (420) is a graphical user interface displayed on a device (a smartphone, a tablet computer, a personal computer, etc.) to display information contained in the repository of the system. The user interface (420) shows the table (421) that shows the hours a user has worked on a project. Selecting the link (422) transitions to the user interface (430) of FIG. 4D.

Figure 4D:
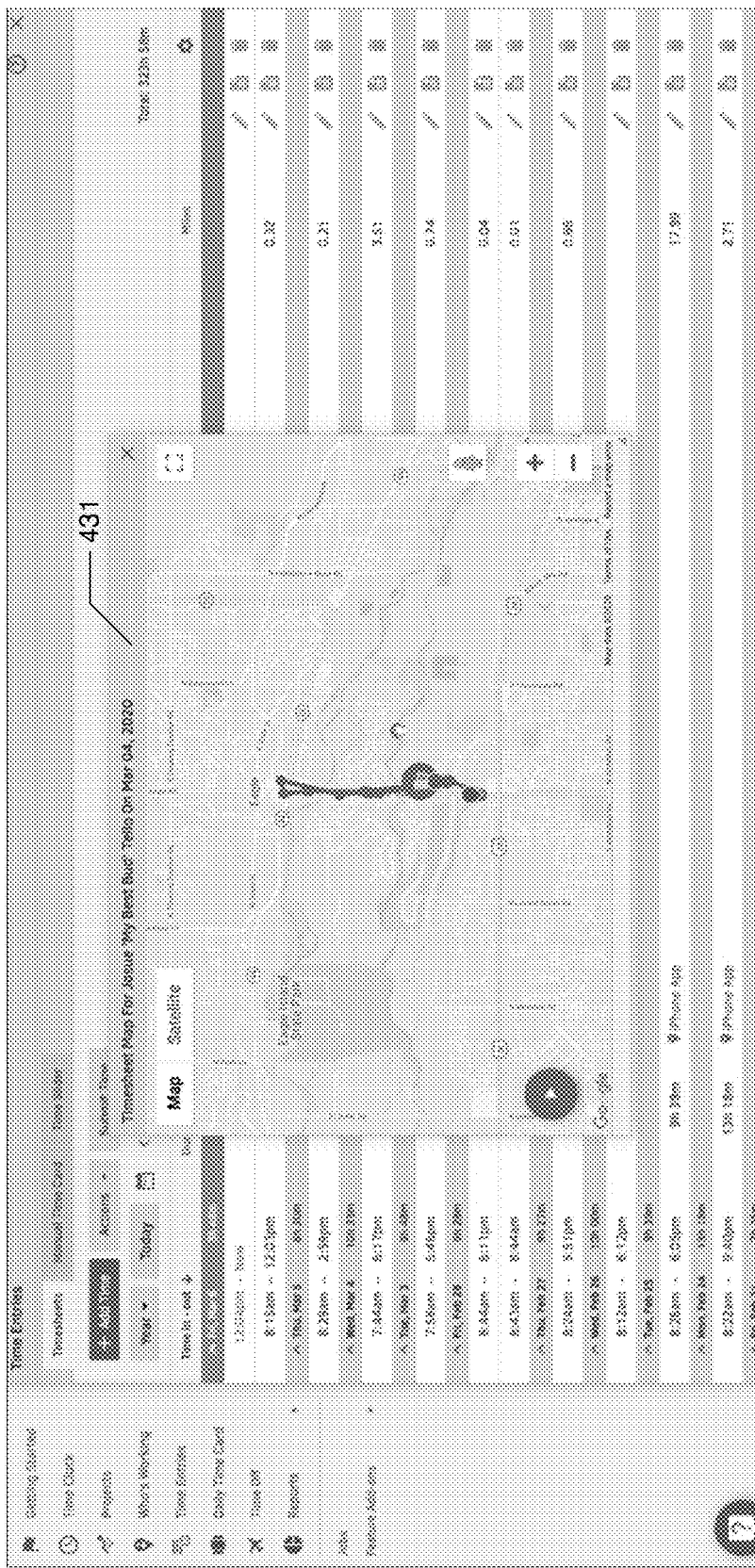

Turning to FIG. 4D, the window (431) is displayed in the user interface (430), which may be displayed on an overwatch device. The window (431) shows a map with each of the location points reported by a user during the time that the user was checked in.

Figure 4E:
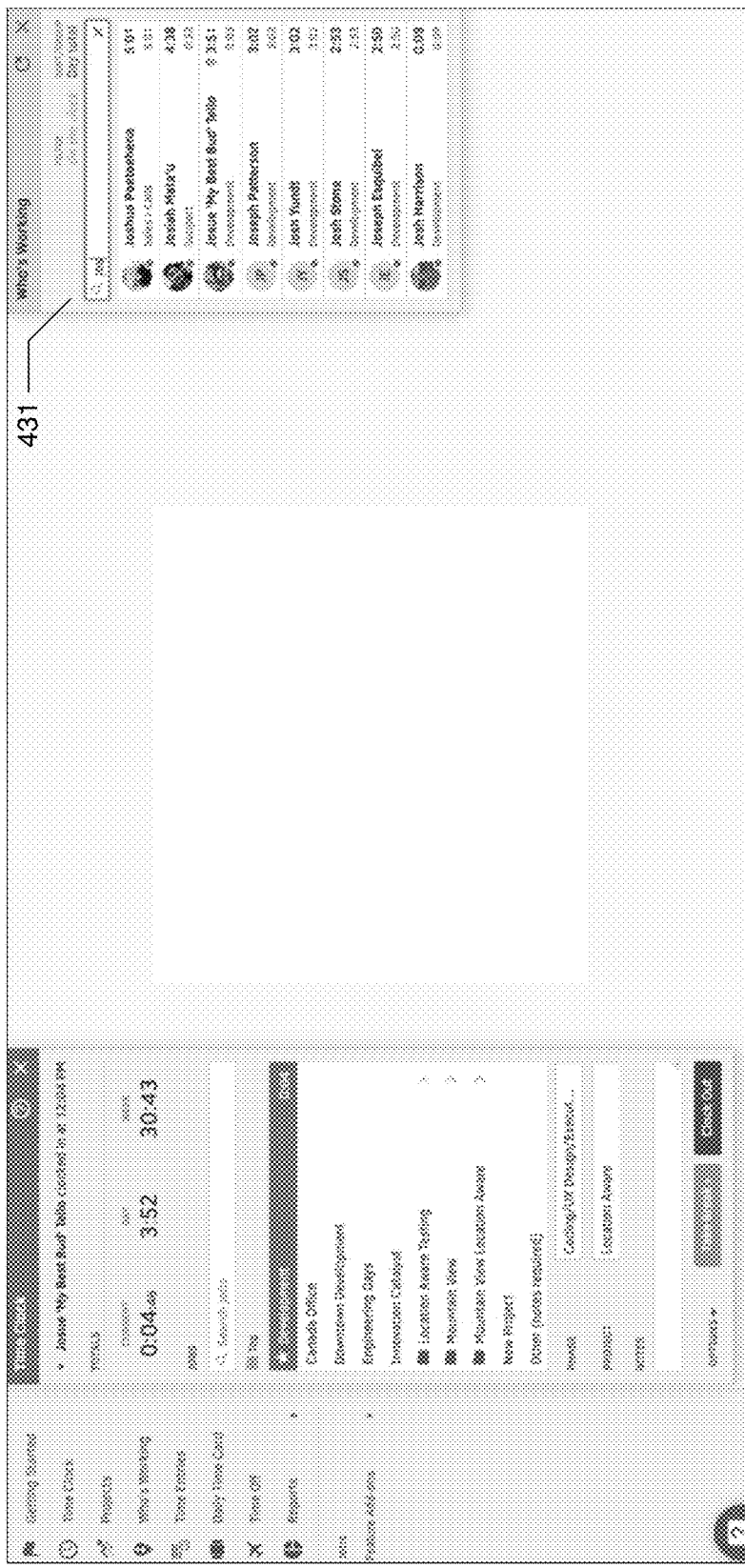

Turning to FIG. 4E, the user interface (440) is a graphical user interface for looking up individual users with the search window (441), which may be displayed on an overwatch device. After selecting a user from the search window (441), the display transitions to the user interface (450) of FIG. 4F.

Figure 4F:
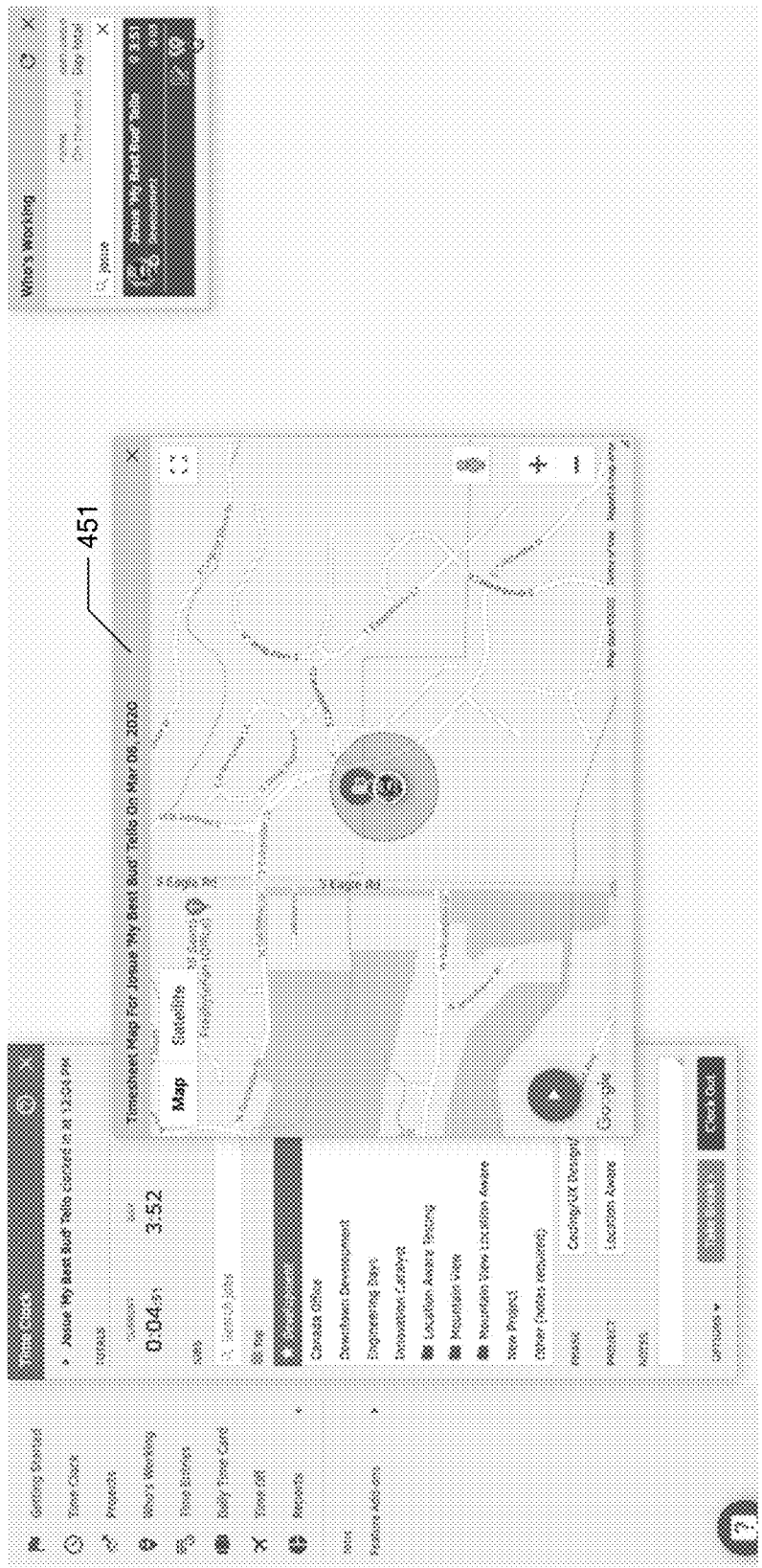

Turning to FIG. 4F, the user interface (450) includes the display of the window (451). The window (451) may be similar to the window (431) of FIG. 4D but showing the current user location instead of a historical user location.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hypertext Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail, such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of a user device, the method comprising:
receiving a broadcast message from a proximate device over a wireless personal area network;
selecting the proximate device as a parent device based on one or more of a children count value from the parent device and a signal strength value for the parent device;
triggering an event that requires recording location data and time data;
establishing a connection over the wireless personal area network to the proximate device;
requesting proximate location data from the proximate device over the connection with a user device location request; and
receiving the proximate location data from the proximate device in a proximate device location response.

2. The method of claim 1, further comprising:
automatically generating a user device event message using the proximate location data; and
transmitting the user device event message.

3. The method of claim 1, further comprising:
receiving the proximate device location response, wherein the proximate device location response comprises a location response code value, a latitude value, a longitude value, an accuracy value, and a date value.

4. The method of claim 1, further comprising:
transmitting the user device event message to the proximate device over the wireless personal area network, wherein the proximate device transmits the user device event message to a server using a mobile network.

5. The method of claim 1, further comprising:
receiving, from the proximate device, the broadcast message, wherein the broadcast message comprises a universally unique identifier (UUID) comprising a base value, a children count value, and an entity identifier value.

6. The method of claim 1, further comprising:
transmitting the user device event message, wherein a server transmits the proximate location data from the user device event message by:
after receiving a user updates request from a set of overwatch devices, automatically generating a set of server location update messages based on the proximate location data when the proximate location data is stored in the repository; and
transmitting the set of server location update messages to the set of overwatch devices.

7. The method of claim 1, further comprising:
transmitting a user device registration message that includes a user identifier identifying a user and a device identifier identifying the user device, wherein the device registration message uses a user device messaging format for the user identifier and for the device identifier; and
transmitting a device update message with updated profile information, wherein the device update message uses the device messaging format for the updated profile information.

8. The method of claim 1, further comprising:
transmitting a device update message with updated profile information to a server that transmits a set of server update messages to a set of overwatch devices.

9. A method comprising:
receiving a user device event message with proximate location data in a user device messaging format, wherein the proximate location data was received by the user device from a proximate device over a wireless personal area network;
receiving the user device event message, wherein the user device selects the proximate device as a parent device based on one or more of a children count value from the parent device and a signal strength value for the parent device;
after receiving a user updates request from a set of overwatch devices, automatically generating a set of server location update messages based on the proximate location data; and
transmitting the set of server location update messages to the set of overwatch devices.

10. The method of claim 9, further comprising:
receiving the user device event message, wherein the proximate location data is from a user device location request comprising a location response code value, a latitude value, a longitude value, an accuracy value, and a date value.

11. The method of claim 9, further comprising:
receiving the user device event message, wherein the user device transmits the user device event message to the proximate device over the wireless personal area network and the proximate device transmits the user device event message to the server using a mobile network.

12. The method of claim 9, further comprising:
receiving the user device event message, wherein the user device receives from the proximate device a proximate device broadcast message that includes a universally unique identifier (UUID) comprising a base value, a children count value, and an entity identifier value.

13. The method of claim 9, further comprising:
receiving, from the user device, the user device event message, wherein the proximate location data was received by the user device by:
receiving a broadcast message from the proximate device;
establishing a connection over the wireless personal area network to the proximate device;
requesting the proximate location data from the proximate device over the connection with a user device location request; and receiving the proximate location data from the proximate device in a proximate device messaging format in a proximate device location response.

14. The method of claim 9, further comprising:

receiving, by a server from the user device, a user device registration message that includes a user identifier identifying a user and a device identifier identifying the user device; , wherein the device registration message uses a user device messaging format for the user identifier and for the device identifier; and receiving a device update message from the user device with updated profile information, wherein the device update message uses the user device messaging format for the updated profile information.

15. The method of claim 9, further comprising:

after receiving a profile updates request from a set of overwatch devices, automatically generating a set of server update messages based on updated profile information when the updated profile information is stored in the repository, wherein the set of server update messages use a plurality of overwatch device messaging formats corresponding to the set of overwatch devices.

16. The method of claim 9, further comprising:

after automatically generating a set of server update messages using a plurality of overwatch device messaging formats, transmitting the set of server update messages to the set of overwatch devices.

17. The method of claim 9, further comprising:

transmitting the set of server location update messages to the set of overwatch devices, wherein the proximate location data is displayed by a first overwatch device from the set of overwatch devices.

18. A system comprising:

a processor and a memory;

an application, wherein the application executes on the processor, uses the memory, and is configured for:

receiving, by the processor, a user device event message with proximate location data in a user device messaging format, wherein the proximate location data was received by the user device from a proximate device over a wireless personal area network;

receiving the user device event message, wherein the user device selects the proximate device as a parent device based on one or more of a children count value from the parent device and a signal strength value for the parent device;

after receiving a user updates request from a set of overwatch devices, automatically generating, by the processor, a set of server location update messages based on the proximate location data; and transmitting, by the processor, the set of server location update messages to the set of overwatch devices.

\* \* \* \* \*